United States Patent [19]
Marolda

[11] Patent Number: 5,755,425
[45] Date of Patent: May 26, 1998

[54] FITTING FOR FLEXIBLE FUEL BLADDER

[75] Inventor: Victor J. Marolda, Salem, Conn.

[73] Assignee: The United States of America as represented by the Secretary of the Navy, Washington, D.C.

[21] Appl. No.: 668,585

[22] Filed: Jun. 20, 1996

[51] Int. Cl.⁶ ............................. F16L 29/00; F16K 51/00
[52] U.S. Cl. ...................... 251/144; 251/148; 285/139.2; 383/96
[58] Field of Search ................................. 251/144, 148, 251/151; 285/139.1, 139.2; 383/96, 103; 220/319, 288, 378

[56] References Cited

U.S. PATENT DOCUMENTS 5,131,553 7/1992 Geasland .................. 383/96 X
5,280,876 1/1994 Atkins .................... 251/144 X

*Primary Examiner*—Kevin Lee
*Attorney, Agent, or Firm*—Michael J. McGowan; Robert W. Gauthier; Prithvi C. Lall

[57] ABSTRACT

Disclosed is a fuel bladder having a flexible bladder wall with a fuel outlet aperture in which a tubular penetration body extends through the aperture and an interior flange on the tubular penetration abuts the interior side of the flexible bladder wall. A tubular valve connection member is superimposed over the fuel outlet aperture such that its outer peripheral surface abuts the inner peripheral surface of the tubular penetration body. A washer and a lock nut are positioned over the tubular penetration member to press the fuel bladder wall against the tubular penetration member interior flange. An O-ring seal is positioned between the proximate surface of the tubular penetration body and the interior side of the bladder wall. Another O-ring seal is positioned adjacent the outer peripheral surface of the tubular penetration body and the exterior side of the bladder wall.

16 Claims, 3 Drawing Sheets

FITTING FOR FLEXIBLE FUEL BLADDER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to fuel cells and containers, and, more particularly, to fuel bladders for use in underwater environment.

2. Description of the Prior Art

Various arrangements have been suggested for fuel cells and other smaller scale fuel containers. U.S. Pat. No. 2,736,356 to Bender, et al. discloses a bladder-type fuel cell having a fuel inlet, a fuel outlet and a pressure air inlet-outlet. One side of the liquid cell collapses against the other side of the liquid cell by expansion of the pressure cell to expel the liquid.

U.S. Pat. No. 2,727,656 to Clifton discloses an aircraft auxiliary fuel cell which is collapsible by means of a single manifold through which a tank is fulled or emptied as controlled by valves.

U.S. Pat. No. 5,154,213 to Malomas et al. discloses a fuel line adapter for portable fuel containers. The fuel container has an outlet/inlet and an annular cap to be received on the inlet. The cap has a shoulder around the upper surface to overlap the inlet/outlet and the adapter is comprised of a flange to be trapped between the outlet/inlet and the cap. A pipe mounting on the adapter allows a pipe to extend from the adapter.

Fuel bladders with flexible walls which enclosed a fuel containing cavity and which has a fuel outlet superimposed over an aperture in the flexible wall are used for marine use. Such fuel bladders are manufactured, for example, by Imtra Corporation of Clearwater, Fla. and Annapolis, Md. as shown in a number of their advertising brochures. In such bladders a vinyl hose tubular fuel outlet is inserted in the flexible bladder wall through an aperture in the bladder wall and is fixed to the bladder by a rubber seal and by a washer and nut combination which are coaxially positioned on the tubular outlet.

One drawback to such surface use prior art marine fuel cells is that the material of the vinyl-hose fittings may take a "cold set", so when a screw cap is installed or removed, torque effects tend to loosen the hose/fitting seal. It has been found that several iterations of normal use (in underwater application) produced a dramatic breakdown of the hermetic barrier even on new bladders.

A second problem with the prior art marine fuel bladder is that the method of securing the bladder to the penetration body of the supply line and the fill tube is a protruding ring molded into a plastic washer. When a nut is screwed down to press the washer down onto the bladder the molded ring presses the bladder into a corresponding circular groove in the penetration body. This arrangement may be subject to leakage under the high pressure at depth. It also may not stand up to rough handling.

A third problem is that the prior art marine bladder fill system uses a screw-on cap having a flat gasket. Rough handling may cause the cap to partially unscrew. As little as one-eighth back turn of the cap can cause a significant fuel leak.

A fourth problem is that the typical single O-ring provides a poor seal when there is no pressure difference to maintain a tight fitting between the O-ring and its seat.

There is, therefore, a need for a durable, leak-proof, fill system for a flexible fuel bladder suitable for use in an underwater (high pressure) environment. There is also a need for fittings for filling the bladder, for air-purge, and for delivery of fuel to an engine underwater without loss of fuel or contamination of fuel by water.

SUMMARY OF THE INVENTION

Accordingly, it is a general purpose and object of the present invention to provide a flexible fuel bladder for underwater operation which prevents loosening of the hose/fitting seal under normal use. It is a second object of the present invention to provide a method of securing the bladder to the penetration body to prevent leakage of fuel at the high pressures experienced at depth. A further object is to provide a fill system which prevents leakage caused by small back-turns of the fill cap. A still further object is to provide a tight O-ring seal in a flexible fuel bladder subject to high pressures.

These objects are accomplished with the fuel bladder of the present invention wherein there is a flexible bladder wall with a fuel outlet aperture. A tubular penetration body extends through the aperture and an interior flange on the tubular penetration abuts the interior side of the flexible bladder wall. A tubular valve connection member is superimposed over the fuel outlet aperture such that its outer peripheral surface abuts the inner peripheral surface of the tubular penetration body. A washer and a lock nut are positioned over the tubular penetration member to press the fuel bladder wall against the tubular penetration member interior flange. O-ring seals are provided on either side of the bladder wall. The tubular valve connection member connects to a valve which controls fuel flow through a supply hose which may be equipped with a manual pump. The fuel bladder is also equipped with an inlet valve.

BRIEF DESCRIPTION OF THE DRAWINGS

The present invention will be more fully understood when the following description is read in light of the accompanying drawings in which.

DETAILED DESCRIPTION OF THE PREFERRED EMBODIMENTS

Figure 1:
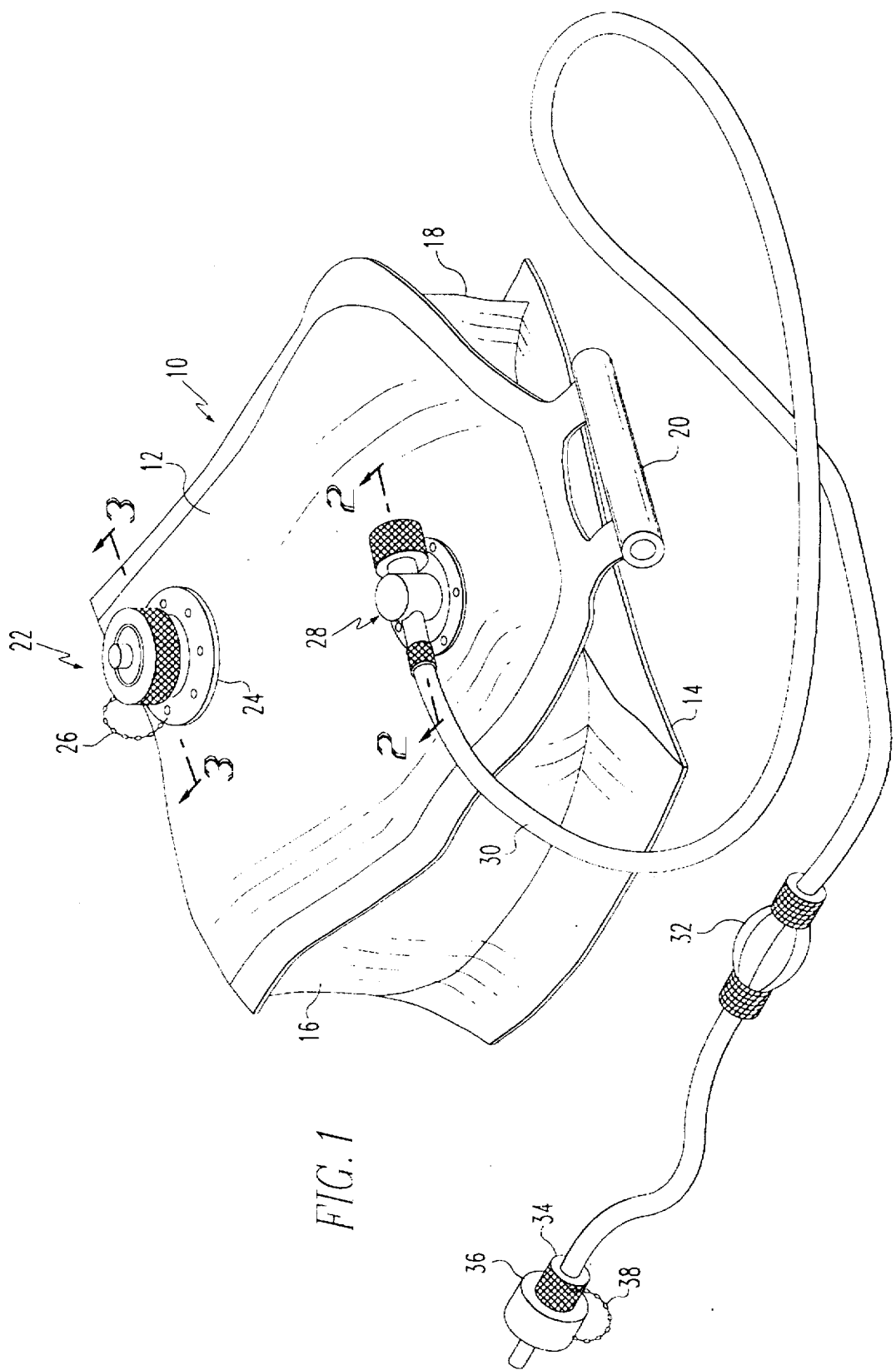
FIG. 1 is a perspective view of a fuel bladder representing a preferred embodiment of the present invention.
Figure 2:
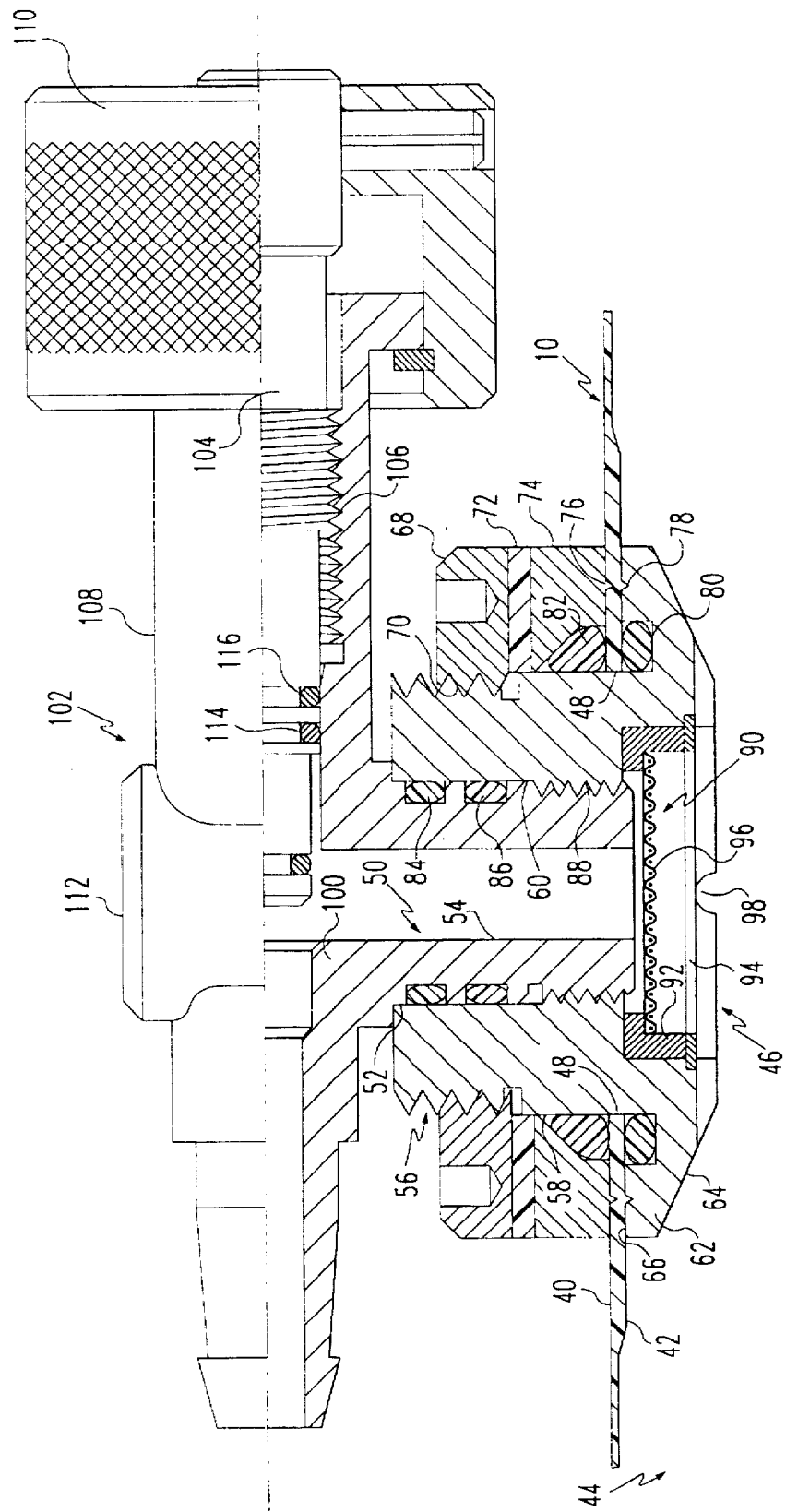
FIG. 2 is an enlarged partially cross sectional view of the fuel supply valve and surrounding structure as taken through line 2—2 in FIG. 1.
Figure 3:
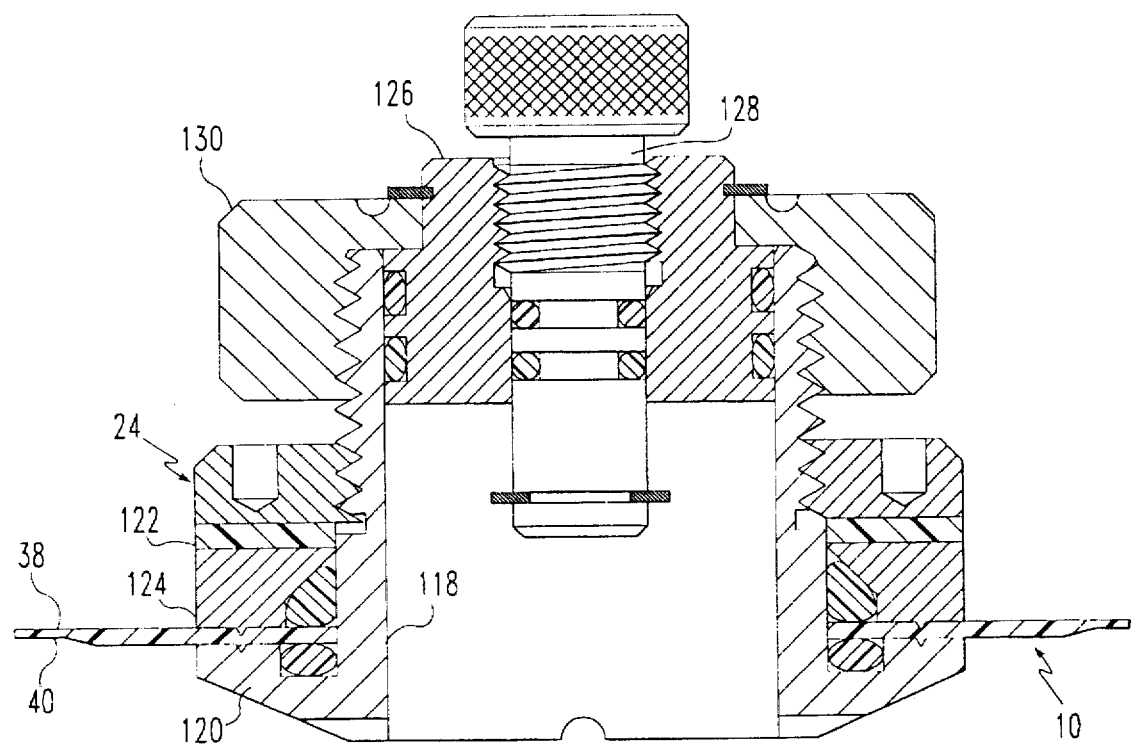
FIG. 3 is an enlarged cross sectional view of the fuel supply valve and surrounding structure as taken through line 3—3 in FIG. 1.

Referring to FIGS. 1, 2 and 3, in the first preferred embodiment of the fuel bladder of the present invention, the bladder comprises a flexible bladder wall shown generally at numeral 10 having a top side 12 and a bottom side 14 and opposed folding lateral walls 16 and 18. There is also a handle 20. On the top side there is a fill/bleed valve shown generally at numeral 22 which is connected to a coupling nut 24 by means of lanyard 26. On the top side there is also a supply/shut-off valve shown generally at numeral 28 from which a plastic supply hose 30 extends first to a supply manual pump 32 and then to engine quick-disconnect plug 34 which is equipped with an engine line end plug 36 which is secured by means of lanyard 38. The material from which the bladder wall is constructed is a flexible, solvent resistant polymeric material and is preferably a fuel resistant, fiber reinforced elastomer. Preferably the overall capacity of the fuel bladder will be about 18 gallons although those skilled in the art will appreciate that the fuel bladder described herein will be adaptable to use with a wide range of capacities. Referring particularly to FIG. 2, it will be seen that the fuel bladder wall has an exterior side 40 and an interior side 42 and an interior cavity shown generally at numeral 44 for retaining a liquid fuel (not shown). In the bladder wall there is also a fuel supply aperture generally at 46 having a peripheral edge 48 which extends through the bladder wall from said exterior side to said interior side. An at least partially exteriorly positioned tubular valve connection member shown generally at numeral 50 has an outer peripheral surface 52 and an opposed inner peripheral surface 54 and is at least in part superimposed in concentric relation over the fuel supply aperture. A tubular penetration body shown generally at numeral 56 has an outer peripheral surface 58, an inner peripheral surface 60 and an interior flange 62. The interior flange has a distal surface 64 and proximate surface 66 and is positioned such that outer peripheral surface 58 of the tubular penetration body abuts peripheral edge 48 of the fuel supply aperture. Inner peripheral surface 60 of tubular penetrating body 56 also abuts outer peripheral surface 52 of the tubular valve connection member 50. Means such as coupling nut 68, which is connected to the tubular penetration body by screw threads 70 and is superimposed over a ceramic/TEFLON RULON slip washer 72 and locking/sealing washer 74, are also provided for pressing the flexible bladder wall against the proximate surface of the interior flange of the tubular penetration body. To further assist in sealing the fuel bladder wall to the tubular penetration body there is a circular concentric ridge 76 on the lower side of the locking/sealing washer which presses a portion of the fuel bladder wall into a concentric recess 78 in the proximate side of the interior flange of the tubular penetration body. To further assist in sealing the peripheral edge of the aperture in the fuel bladder wall, O-rings 80 and 82 are provided in recesses, respectively, in the locking/sealing washer and the tubular penetration body on the exterior and interior sides of the fuel bladder wall. O-rings 84 and 86 are also provided in recesses in the tubular valve connection member between the outer surface of that member and the inner surface of the tubular penetration body. The tubular valve connection member and the tubular penetration body are connected by screw threads 88. The tubular penetration body and the tubular valve connection member are superimposed over a screen assembly which is shown generally at numeral 90. This screen assembly is comprised of a tubular support 92 which engages a snap ring 94 on the tubular penetration body and a circular screen 96 which is attached at its peripheral edge to the tubular support. On the tubular penetration body there is also a blockage prevention groove 98. The tubular valve connection member has an outer terminal end 100 which it is connected to an exterior valve shown generally at numeral 102. The valve includes a valve body 104 which is engaged on screw thread 106 by valve stem 108 which has at its terminal end a valve knob 110. A valve body cap 112 is superimposed over the valve body, and the valve is also equipped with O-rings as at 114 and 116. Referring particularly to FIG. 3, the fill/bleed valve has a generally similar construction and is comprised of a tubular penetration member 118 with an interior flange 120. The coupling nut 24 superimposed over washers 122 and 124 presses the fuel bladder wall against the interior flange. The plug body 126 and valve 128 are positioned inside tubular penetration member 118 and are supported by valve support 130. Tubular penetration body 56, tubular valve connection member 50 and valve 102 are suitable metallic material such as naval brass, bronze or injection molded plastic.

It will be appreciated that a flexible fuel bladder has been described which is suitable for use in an underwater or other high pressure environment. It will also be appreciated that this fuel bladder has fittings which are capable of facilitating filling the bladder, air-purging and delivery of fuel to an engine underwater without loss of fuel or contamination of fuel by water. Further, it will be appreciated that the double O-ring structure between the proximate surface of the tubular penetration body and the interior side of the bladder wall and between the outer peripheral surface of the tubular penetration body and the exterior side of the bladder wall allows for a particular efficient seal.

While the present invention has been described in connection with the preferred embodiments of the various figures, it is to be understood that other similar embodiments may be used or modifications and additions may be made to the described embodiment for performing the same function of the present invention without deviating therefrom. For example, the fill/bleed valve 22 and supply/shut-off valve 28 may be combined into a single valve, thus eliminating one penetration through the bladder wall. Such a combined valve might be connected to a hose similar to supply hose 30 which would extend to a manual pump similar to pump 32. Therefore, the present invention should not be limited to any single embodiment, but rather construed in breadth and scope in accordance with the recitation of the appended claims.

What is claimed is:

1. In combination with a flexible bladder comprising a flexible bladder wall with an exterior side and an interior side and an interior cavity for retaining a liquid fuel, there being in said bladder wall a fuel supply aperture having a peripheral edge extending through said bladder wall from said exterior side to said interior side, a fuel bladder fitting comprising:

an at least partially exteriorly positioned tubular valve connection member having an outer peripheral surface and an opposed inner peripheral surface and at least in part superimposed in concentric relation over the fuel supply aperture;

a tubular penetration body having an outer peripheral surface, an inner peripheral surface and an interior flange having a distal and proximate surface and being positioned such that the outer peripheral surface of the tubular penetration body abuts the peripheral edge of the fuel supply aperture and the inner peripheral surface of the tubular penetration body abuts the outer peripheral surface of the tubular valve connection member;

a first sealing means between the proximate surface of the tubular penetration body and the interior side of the bladder wall;

a second sealing means adjacent the outer peripheral surface of the tubular penetration body and the exterior side of the bladder wall; and means for pressing the flexible bladder wall against the proximate surface of the interior flange of the tubular penetration body compressing the first and second sealing means to form a tight seal.

2. The combination of claim 1 wherein the tubular valve connection has an outer terminal end at which said tubular valve connection is connected to an exterior valve means.

3. The combination of claim 2 wherein the valve means is connected to a fuel supply hose.

4. The combination of claim 3 wherein the fuel supply hose is equipped with a pump means.

5. The combination of claim 4 wherein the valve means has a longitudinal valve body positioned generally perpendicularly to the tubular valve connection member.

6. The combination of claim 5 wherein a longitudinal valve stem is coaxially positioned inside the valve body.

7. The combination of claim 6 wherein the longitudinal valve stem is moveable on a screw thread inside the valve body.

8. The combination of claim 7 wherein the valve stem is equipped with a terminal valve knob.

9. The combination of claim 8 wherein the means for pressing the flexible bladder is a coupling nut concentrically positioned in outer abutting relation with the tubular penetration body.

10. The combination of claim 9 wherein at least one washer is interposed between the coupling nut and the exterior side of the bladder wall.

11. The combination of claim 10 wherein the coupling nut engages the outer peripheral surface of the tubular penetration body by interlocking screw threads.

12. The combination of claim 1 wherein the outer peripheral surface of the tubular valve connection member engages the inner peripheral surface of the tubular penetration body by interlocking screw threads.

13. The combination of claim 1 wherein a fuel filling means is provided.

14. The combination of claim 1 wherein the bladder wall is comprised of opposed top and bottom major sides and collapsible lateral sides.

15. The combination of claim 1 wherein there is a circular concentric recess in the proximate surface of the interior flange and downwardly projecting ridge means are provided to press the fuel bladder wall into said recess.

16. The combination of claim 1 wherein the tubular valve connection member and the tubular penetration body are metallic.

* * * * *